UNITED STATES PATENT OFFICE.

FERNANDO SOMOZA VIVAS, OF SAN FRANCISCO, CALIFORNIA, ASSIGNOR OF ONE-HALF TO THEODORE A. BELL, OF SAN FRANCISCO, CALIFORNIA.

FIREPROOF PAINT.

1,369,857.     Specification of Letters Patent.     Patented Mar. 1, 1921.

No Drawing.     Application filed August 10, 1920. Serial No. 402,652.

*To all whom it may concern:*

Be it known that I, FERNANDO SOMOZA VIVAS, a citizen of the United States, residing at San Francisco, in the county of San Francisco and State of California, have invented certain new and useful Improvements in Fireproof Paint, of which the following is a specification.

My invention relates to a fire-proofing paint or composition, and it has for its object the production of a composition of this character which will be highly efficient for the purpose for which it is designed, and at the same time economical in cost of production and application, and which will render incombustible those substances which are ordinarily destructible by fire.

The composition which constitutes my invention is applicable to the fire-proofing of wood, paper and all other inflammable materials, and has been found in actual practice highly efficient for that purpose.

A further advantage of my improved composition consists in the preservative action of the same on materials to which it is applied, such as piles, ship bottoms and all surfaces exposed to the action of salt water, it also rendering such surfaces proof against the attack of teredo, or the destructive action of other marine parasites.

A further advantage of my improved composition consists in the fact that the same produces a high order of brilliancy which is not affected by the action of the elements.

My invention consists in a composition composed of the following enumerated ingredients or their equivalents, combined substantially in the proportions hereinafter set forth:

| | |
|---|---|
| Milk | 19 parts |
| Sodium tungstate | 5 parts |
| Borax | 10 parts |
| Gum arabic | 10 parts |
| Kaolin | 20 parts |
| Zinc white | 10 parts |
| Sodium silicate | 10 parts |
| Potassium silicate | 6 parts |
| Felspar | 10 parts |

To the above composition any suitable coloring material may be added to give the same such direct permanent color as may be desired.

Having thus described my invention what I claim as new and desire to secure by Letters Patent is—

1. A fire-proofing paint or composition composed of the following materials: milk, sodium tungstate, borax, gum arabic, kaolin, zinc white, sodium silicate, potassium silicate and felspar.

2. A fire-proofing paint or composition composed of the following materials in substantially the relative proportions set forth: milk 19 parts; sodium tungstate 5 parts; borax 10 parts; gum arabic 10 parts; kaolin 20 parts; zinc white 10 parts; sodium silicate 10 parts; potassium silicate 6 parts and felspar 10 parts.

In testimony whereof I affix my signature in the presence of two witnesses.

FERNANDO SOMOZA VIVAS.

Witnesses:
   F. MIRIAM MEYER,
   F. L. BROWNE.